United States Patent [19]

Andrews et al.

[11] 4,050,294
[45] Sept. 27, 1977

[54] APPARATUS AND METHOD OF MEASURING SURFACE ROUGHNESS

[75] Inventors: Michael Joseph Andrews, Seattle; William Allen Davis, North Bend; Roger Alvin Senske, Seattle, all of Wash.

[73] Assignee: The Boeing Company, Seattle, Wash.

[21] Appl. No.: 702,840

[22] Filed: July 6, 1976

[51] Int. Cl.² .............................................. G01B 5/28
[52] U.S. Cl. .................................... 73/105; 33/174 P
[58] Field of Search ........... 73/105; 33/174 L, 174 P, 33/174 Q

[56] References Cited

U.S. PATENT DOCUMENTS

| 2,914,938 | 12/1959 | Laakso | 73/105 |
| 3,120,121 | 2/1964 | Witzke | 73/105 |
| 3,377,828 | 4/1968 | Harmon | 73/105 X |
| 3,534,596 | 10/1970 | Batts et al. | 73/105 |
| 3,795,132 | 3/1974 | Huling et al. | 73/105 |

*Primary Examiner*—James J. Gill
*Attorney, Agent, or Firm*—Frederick J. McKinnon, Jr.; Bernard A. Donahue

[57] ABSTRACT

A carriage mounted to be driven with a reciprocating motion carries a probe with a stylus and also carries a yoke to move relative to a potentiometer. The unit includes a readily replaceable bushing to permit alignment of the probe in various sizes of holes. A drive unit and a logic circuit controls movement of the carriage.

10 Claims, 7 Drawing Figures

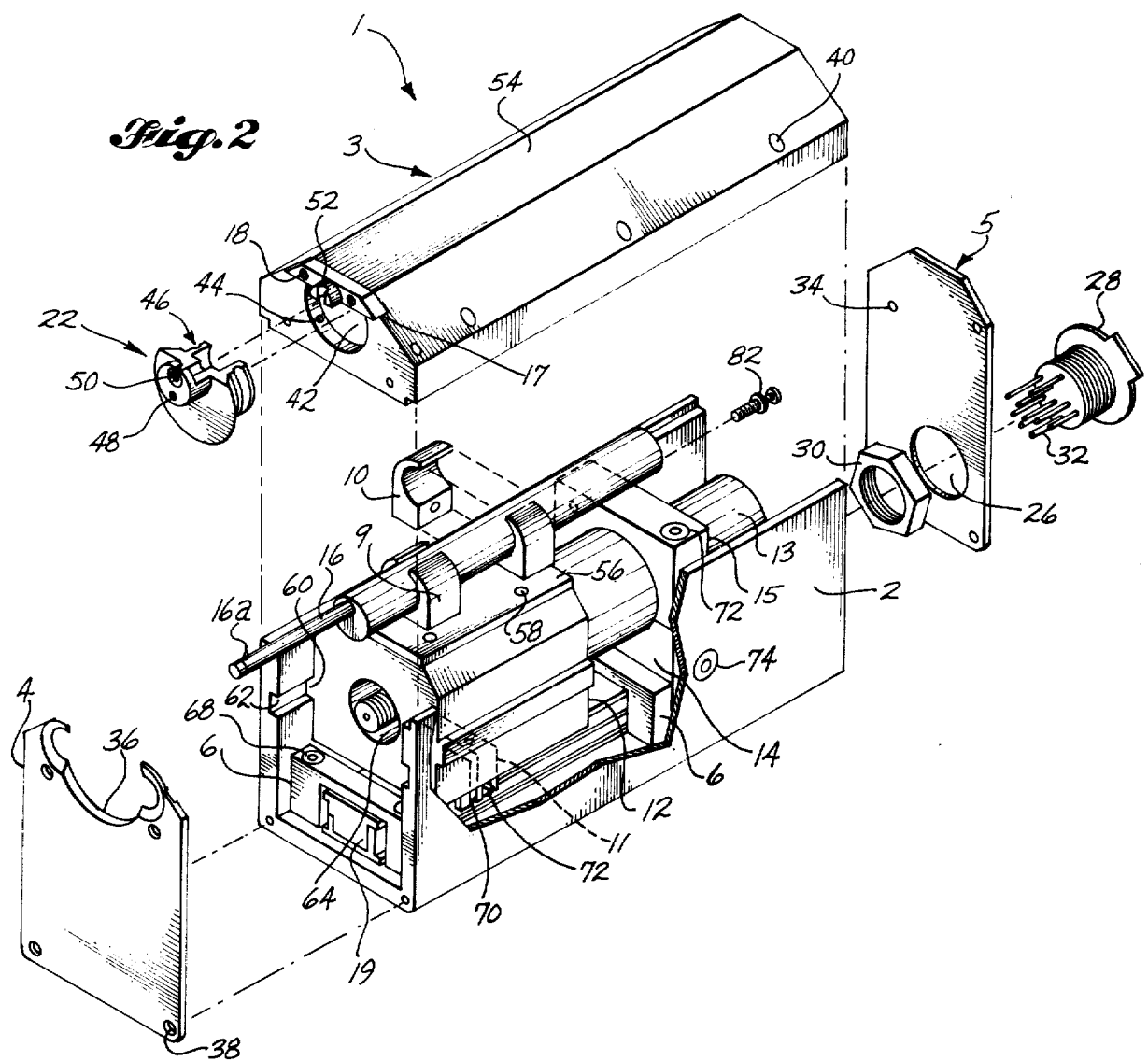

APPARATUS AND METHOD OF MEASURING SURFACE ROUGHNESS

BACKGROUND OF THE INVENTION

Field of the Invention

This invention relates to an apparatus for measuring the finish of a surface or the finish of the surface of the interior wall portion of fastener holes.

The standard for surface texture, as determined by the American Standards Association specifies the use of a stylus type instrument for measuring the roughness of surface finishes. Such instruments convert the vertical motions of a stylus as it traverses surface irregularities into electrical signals by means of a transducer. The resulting signals are then conditioned and displayed, usually by a meter, as a surface roughness value. While commerical instruments of this type have been quite successful when applied to relatively flat surfaces, they have heretofore not been well-suited for inspection of the interior wall portions of fastener holes.

Manual positioning of such instruments has resulted in expensive and time consuming procedures to accomplish examination of the desired wall portions of fastener holes while at the same time avoiding the upper and lower edges of such holes. The fixed stroke length of such instruments usually requires more than one setup procedure to inspect the interior walls of holes bored through thicker surfaces. At the same time, the stroke length generally prohibits the inspection of the walls of holes bored through thinner surfaces. Manual operation of such instruments produces inconsistent stylus pressures resulting in unstable and inaccurate surface roughness measurements.

SUMMARY OF THE INVENTION

A control and readout assembly contains a logic circuit for controlling movement of a probe having a stylus and for measuring roughness of a surface traversed by the stylus. The probe is mounted to a carriage or nut which moves with a reciprocating movement in response to a motor which is directed by the control circuit. The unit when used to measure the roughness of a hole, is aligned to the hole with a pilot device having an extension to act as a bushing in the hole. The pilot device snaps into a housing for the roughness measuring unit, the bushing mates in the hole and the probe extends out of the housing and through the bushing in the pilot device with the stylus contacting the side of the hole. To align into different size holes the pilot with bushing is removed and a new pilot with a bushing extension sized to the new hole is snapped into the housing.

It is an object of the present invention to provide an improved apparatus for measuring surface roughness.

Another object of the present invention is to provide an apparatus for measuring the roughness of the interior wall portion of fastener holes.

A still further object of the present invention is to provide a single apparatus to measure the finish of surfaces and interior wall portion of fastener holes.

Yet another object of the present invention is to provide an apparatus which will record on a visual display the value of surface roughness.

A still further object of the present invention is to provide an apparatus for measuring surface roughness which may be operated over a predetermined portion of such a surface.

A still further object of the present invention is to provide an apparatus which may be operated from either conventional power sources or a self-contained power supply.

A still further object of the present invention is to provide an apparatus which may be utilized in shop production areas by unskilled operators.

Additional objects of the present invention reside in the specific operation and construction of the exemplary apparatus hereinafter particularly described in the several drawings.

BRIEF DESCRIPTION OF THE DRAWINGS

Novel features of the present invention will be more readily understood from a consideration of the following description, taken together with the accompanying drawings, in which a preferred adaptation is illustrated with the various parts identified by suitable reference characters in each of the views, and in which:

FIG. 2 is an exploded perspective view of the probe assembly unit;

DESCRIPTION OF THE PREFERRED EMBODIMENT

Figure 1:
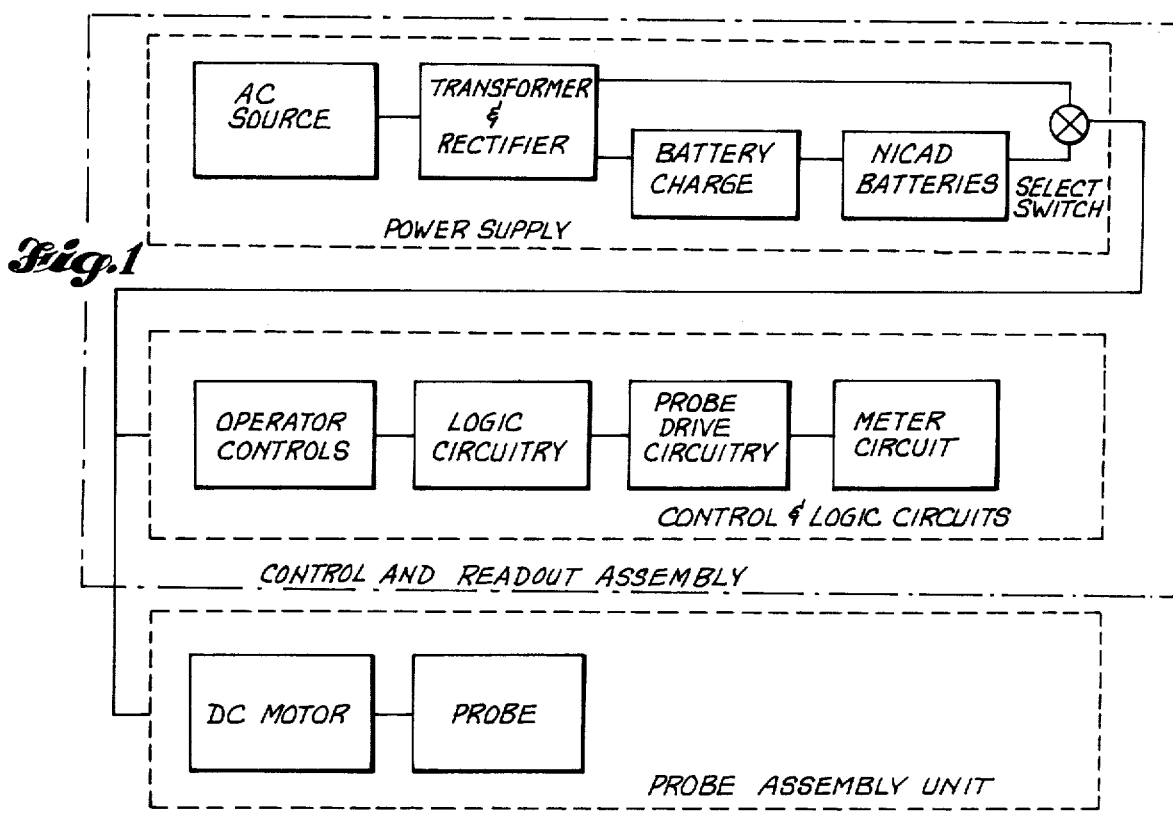
FIG. 1 is a functional block diagram of a preferred embodiment of the present invention.

With reference to FIG. 1, the apparatus for measuring surface roughness generally comprises a control and readout assembly, and a hand-held probe drive assembly. The control and readout assembly further comprises manually selectable power supply sources and the control and logic circuitry required to operate the handheld probe assembly. The control and logic circuitry includes manually operated adjustment controls and a meter display of the roughness value of the surface under test. The probe drive assembly unit, essentially comprises a motor, a probe and support structures for the motor and probe.

Probe Drive Assembly Description

Referring to FIG. 2, the probe drive assembly is generally designed at 1. The probe drive assembly is contained within case 2 and comprises motor 13, potentiometer assembly 19, probe 16, nut 12 and various supporting bracketry as will be discussed below. Case 2 is enclosed at motor 13 end by rear cover 5, at probe 16 end by face plate 4, and along its top by case cover 3.

Rear cover 5 contains hole 26 through which threaded connector 28 passes. Connector 28 contains a plurality of pins 32 supplying the electrical power, ground (via grounding lug 82) and required control signals to probe drive assembly 1. Rear cover 5 is secured to case 2 by a plurality of threaded screws (not shown) that pass through a plurality of holes 34 and engage case 2 at motor 13 end.

Face plate 4 contains opening 36 allowing a clearance between pilot 22 and face plate 4 when face plate 4 is secured to case 2. Face plate 4 is secured to case 2 by a plurality of threaded screws (not shown) that pass through a plurality of holes 38 and engage case 2 at probe 16 end.

Case cover 3 extends the length of case 2 and is secured to the top of case 2 by a plurality of threaded screws (not shown) passing through a plurality of holes 40. Opening 42 at probe 16 end of case cover 3 contains a plurality of steel balls 44 located substantially around the circumference of opening 42. Opening 42 accommodates pilot 22 which snap fits into said opening and is retained therewith by groove 46 contained in pilot 22 and a plurality of steel balls 44 contained circumferentially around opening 42. Pilot 22 contains a cylindrical extension 48 which is an integral part of pilot 22. Cylindrical extension 48 contains hole 50 of sufficient diameter to allow probe 16 to freely pass. The diameter of cylindrical extension 48 substantially approximates the diameter of the hole into which it is inserted prior to the initiation of a roughness measurement as will be discussed below. The present invention can measure the roughness of multi-diameter fastener holes by replacing pilot 22 with a substantially similar pilot 22 containing a larger or smaller diameter cylindrical extension 48.

Pilot support 17 is secured to case cover 3 by a plurality of threaded screws 18. Pilot support 17 contains projection 52 which engages cylindrical extension 48 when pilot 22 engages case cover 3.

Case cover 3 is substantially a trapezoid in cross-section area with top surface 54 machined to a substantial flatness. Case 2, rear cover 5, face plate 4, and case cover 3 are each machined from lightweight metal.

Probe 16 is a commercial, small bore probe employing stylus 16a and a piezoelectric transducer (not shown). The transducer converts the vertical motions of stylus 16a into electrical signals as stylus 16a traverses surface irregularities. Probe 16 is secured to plate 56 by a plurality of probe sensor support brackets 9 and a plurality of bracket clamps 10. Sensor support brackets 9 are an integral part of plate 56 and are secured to bracket clamps 10 by a plurality of threaded screws and bolts (not shown). Plate 56 is secured to nut 12 by a plurality of screws (not shown) passing through a plurality of holes 58. Plate 56, probe sensor suppot brackets 9, and bracket clamps 10 are machined from a lightweight metal.

Figure 3:
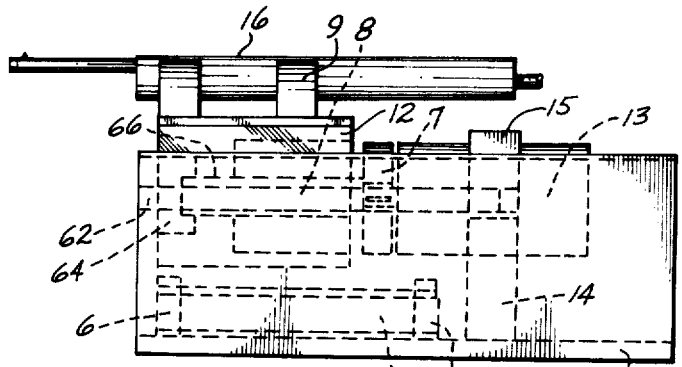
FIG. 3 is a side elevation view of the probe assembly unit of FIG. 2.
Figure 4:
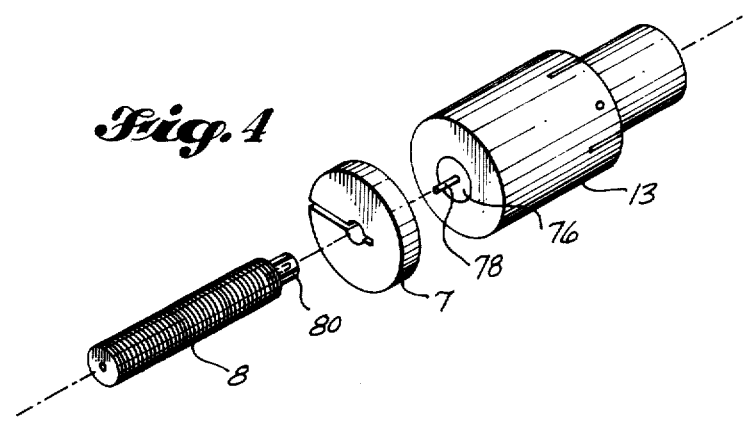
FIG. 4 is a perspective view of the probe assembly unit motor and lead screw.

Nut 12 is contained within case 2 by a plurality of tracks 60 located on either side of nut 12 and engaging a plurality of mutually cooperating grooves 62 machined into opposite sides of case 2. With reference to FIG. 3, it can be seen that bored through nut 12, along its major axis, is multiple diameter hole 64. Hole 64 is of sufficient diameter of enclose lead screw clamp 7 on motor 13 end of case 2, and of a somewhat smaller diameter on face plate 4 side of case 2. Contained within hole 64 are a plurality of threads 66 which engage a mutually complementary plurality of threads contained in lead screw 8. In this manner, when lead screw 8 is rotated, nut 12, and hence probe 16, travels along track 62 in a direction determined by the rotation of lead screw 8. In the preferred embodiment, the length of travel along track 62 is approximately 0.70 inch. Nut 12 is constructed from a low friction plastic type material which insures adequate lubrication in groove 62.

Potentiometer assembly 19 is contained within case 2 and located beneath nut 12. Potentiometer assembly 19 is secured to case 2 by a plurality of potentiometer clamps 6, and a plurality of screws 68. Potentiometer assembly 19 is connected to nut 12 by potentiometer slider yoke 11. Said yoke, an "ell" shaped structure, contains notch 70 machined into the shorter leg of said structure. Notch 70 engages wiper arm extension 72 on potentiometer assembly 19. Potentiometer slider yoke 11 is secured to nut 12 by a plurality of screws (not shown). In this manner, when nut 12 travels along track 62, the potentiometer slider yoke 11 causes the the resistance and voltage across potentiometer assembly 19 to vary.

Motor 13 is a commercial DC-type motor and is rigidly secured in case 2 by upper support motor housing 15 and lower support motor housing 14. Said motor housings are secured to each other by a plurality of screws 72, and to case 2 by a plurality of screws 74. Lead screw 8 is attached to motor 13 by lead screw clamp 7. Lead screw 8 attaches to motor 13 through collar 76 motor extension 78 and receptacle 80 located on one end of lead screw 8.

Control and Readout Assembly Description

Figure 5:
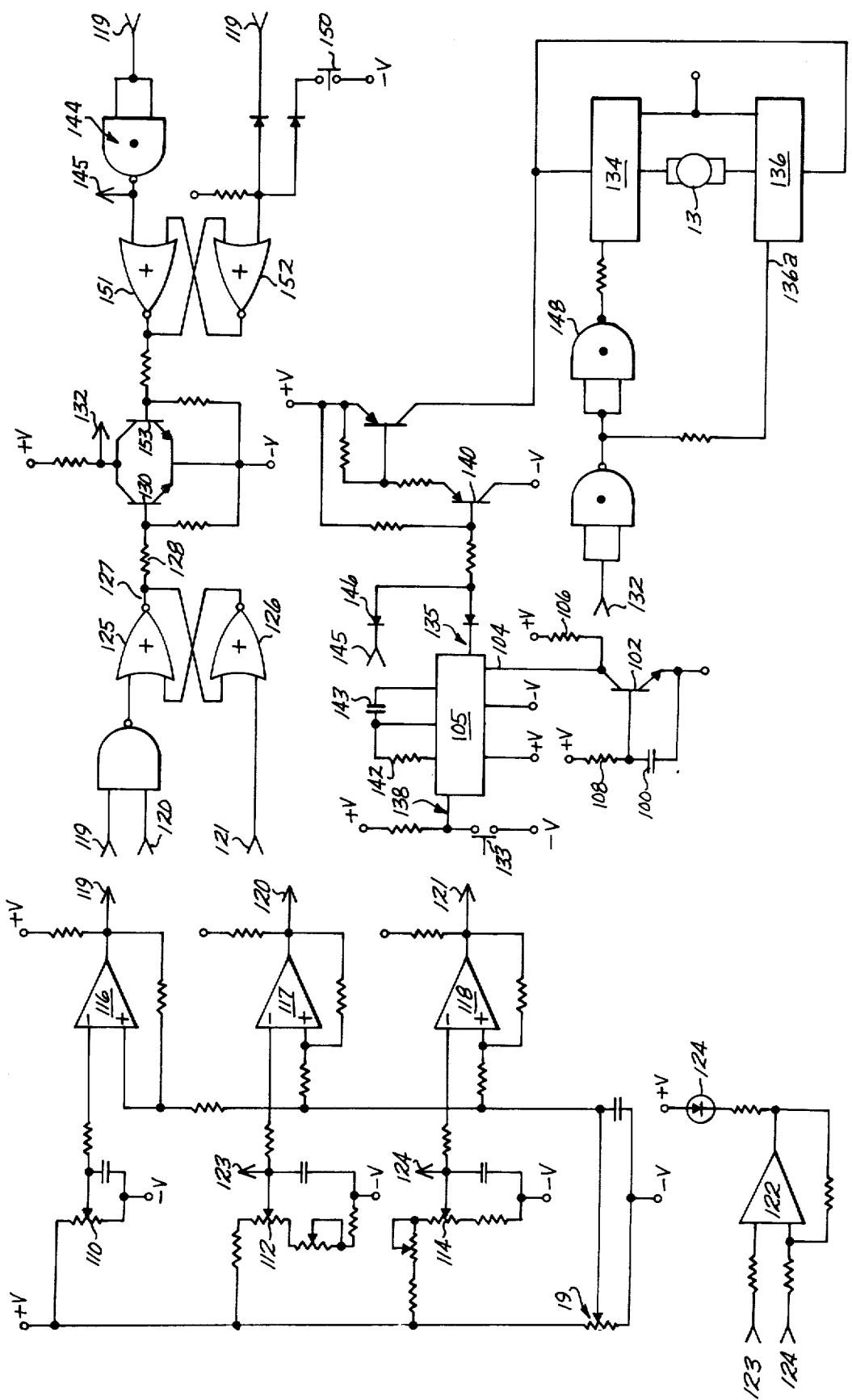
FIG. 5 is an electrical schematic of a preferred embodiment of the control and logic circuitry of the present invention.

The control and readout assembly essentially comprises the control and logic circuitry for the probe drive assembly, a manually selectable power supply source, and a meter assembly. Referring to FIG. 5, the operation of the control and readout assembly as well as the present invention, can best be understood by following a typical sequence of events from power turn-on to termination.

At power turn-on, capacitor 100 acts as a short circuit insuring transistor 102 is in the non-conductive or off condition. In this configuration, transistor 102 is effectively an open circuit. This allows control pin 104 of one-shot 105 to be held high by pull-up resistor 106 disabling one-shot 105 from initiating a pulse to start motor 13. (It is to be noted that subsequent references to high refer to a logic level "one", and subsequent references to low refer to a logic level "zero".) The voltage on capacitor 100 increases to approximately 0.7 volt D.C., with a time constant determined by resistor 108 and capacitor 100. This in turn causes transistor 102 to conduct forcing control pin 104 of one-shot 105 to a low state. In this condition, one-shot 105 is enabled. It can be seen that resistors 106 and 108, capacitor 100 and transistor 102 act as a power turn-on reset circuit, preventing motor 13 from being initiated at power turn-on.

Potentiometer assembly 19, physically located within probe drive assembly 1, utilizes a variable wiper arm with its position governed by nut 12 and slider yoke 11 as has been previously discussed. The voltage from the wiper arm varies as probe 16 position along track 62 varies. This voltage is compared with voltages determined by three potentiometer assemblies 110, 112 and 114. Park set potentiometer 110 determines probe 16 park set position. In this position, probe 16 is retracted within probe drive assembly 1 such that stylus 16a is enclosed by case cover 3. When probe 16 is in this position, motor 13 is stopped and all power is removed preventing further movement of probe 16. Low end potentiometer 112 and high end potentiometer 114 determine the low and high end stroke limits of probe 16. These potentiometers are controlled manually and allow for variations of the stroke length by 0.030 inches within a 0.70 inch full stroke length.

A plurality of voltage comparators 116, 117 and 118 compare the output voltages from park set potentiometer 110, low end set potentiometer 112, and high end set potentiometer 114 with that generated by potentiometer assembly 19. The comparator outputs 119, 120 and 121 respectively, typically ranging between a high and low state, are used as digital logic states to control other circuitry. An additional voltage comparator 122 compares the voltage produced by low end set potentiometer 112, signal 123, with that produced by high end set potentiometer 114 signal 124. When low end set potentiometer 112 setting, representing the low stroke travel of probe 16, is incorrectly set greater than high end potentiometer 114 setting, representing the maximum stroke travel of probe 16, an indication is produced. In the preferred embodiment this is accomplished by light emitting diode assembly 124, although other embodiments may be used to practice this feature.

Table 1 below contains a summary of the corresponding output logic states from the plurality of voltage comparators 116, 117 and 118. With reference to this Table, an understanding of the following description will be greatly aided.

TABLE 1

| Probe Position | Signal 119 | Signal 120 | Signal 121 |
| --- | --- | --- | --- |
| prior to start | 0 | 0 | 0 |
| at park set and above | 1 | 0 | 0 |
| at low set and above | 1 | 1 | 0 |
| at high set | 1 | 1 | 1 |

Signals 119, 120 and 121 control logic gates 125 and 126 which are wired in the preferred embodiment as cross-coupled logic NOR gates. In this manner, logic gates 125 and 126 form a simple yet effective memory device. The output signal from this memory device, signal 127, is applied through resistor 128 to control the state of transistor 130. The output of transistor 130, signal 132, is applied to a dual set of inverters formed by logic gates 146 and 148 and controls a plurality of unity gain current drivers 134 and 136 which supply power to motor 13. It can be seen that with the use of dual inverters 146 and 148, signal 132 controls the polarity of the power supply across motor 13 which in turn determines the direction of motor 13 rotation. If signal 132 is low, a high state is produced at input 136a to current driver 136 causing motor 13 rotation to drive nut 12 and hence probe 16 in one direction. When signal 132 is high, a low state is produced at input 136a to current driver 136 causing motor 13 to rotate in an opposite direction.

When start button 133 is depressed, forcing input pin 138 of one-shot 105 to a low condition, a low going pulse is produced at output pin 135. A low going pulse is one which is normally in a high state but momentarily makes a transition to a low state. The duration of said pulse is determined by the time constant of resistor 142 and capacitor 143. Low going pulse 135 forces transistor 140 into conduction, thus supplying power to current drivers 134 and 136 and motor 13. The polarity is such that motor 13 drives probe 16 out of probe drive assembly 1 past its park set position. Before the time constant formed by resistor 142 and capacitor 143 forces low going pulse 135 into a high state the logic circuitry of the control and readout assembly is such that signal 119 is high, signal 120 is low and signal 121 is low. (See Table 1). In addition signal 119 is applied to inverter 144 to form its logical complement, signal 145. This signal keeps transistor 140 in conduction during normal operations. This is accomplished by a hard wired OR logic element composed of diodes 146 and 147.

As probe 16 continues to progress outwardly from probe drive assembly 1, it passes the low end setting determined by potentiometer 112. At this time comparator 117 produces a high signal on line 120. The control and readout assembly is then in a condition such that signal 119 is high, signal 120 is high and signal 121 is low. When probe 16 reaches the high end setting, as determined by potentiometer 114, the control and readout assembly is in a conditon such that signal 119 is high, signal 120 is high and signal 121 is high. At this point, the memory formed by logic gates 125 and 126 switches states, causing transistor 130 to cease conduction, and forcing signal 132 to a high state. Since signal 132 is applied to a series of inverters 146 and 148, the polarity on motor 13 changes causing it to rotate in the opposite direction. As a result probe 16 is retracted. At this point, signal 119 is high, signal 120 is high and signal 121 is low. Probe 16 continues to retract until it passes the low end setting at which time signal 119 is high, signal 120 is low, and signal 121 is low. Once again the memory formed by gates 125 and 126 changes logic states, eventually changing motor 13 polarity, and probe 16 begins to travel outwardly. This process is repeated until stop button 150 depressed.

When stop button 150 is depressed, the two state memory formed by logic elements 151 and 152 goes to a high state. This memory controls the conduction of transistor 153 which is configured in a hard wired OR with transistor 130. When the memory goes to a high state, transistor 153 conducts forcing signal 132 into a low condition. This in turn controls the polarity of the power supply to motor 13 causing motor 13 to immediately retract probe 16 within probe assembly unit 1. As probe 16 passes the park setting, the logic in the control and readout assembly returns to a state such that signal 119 is low, signal 120 is low and signal 121 is low. This condition causes transistor 140 to cease conduction thereby removing power from motor 13. The memory is then reset to its initial logic state.

Figure 6:
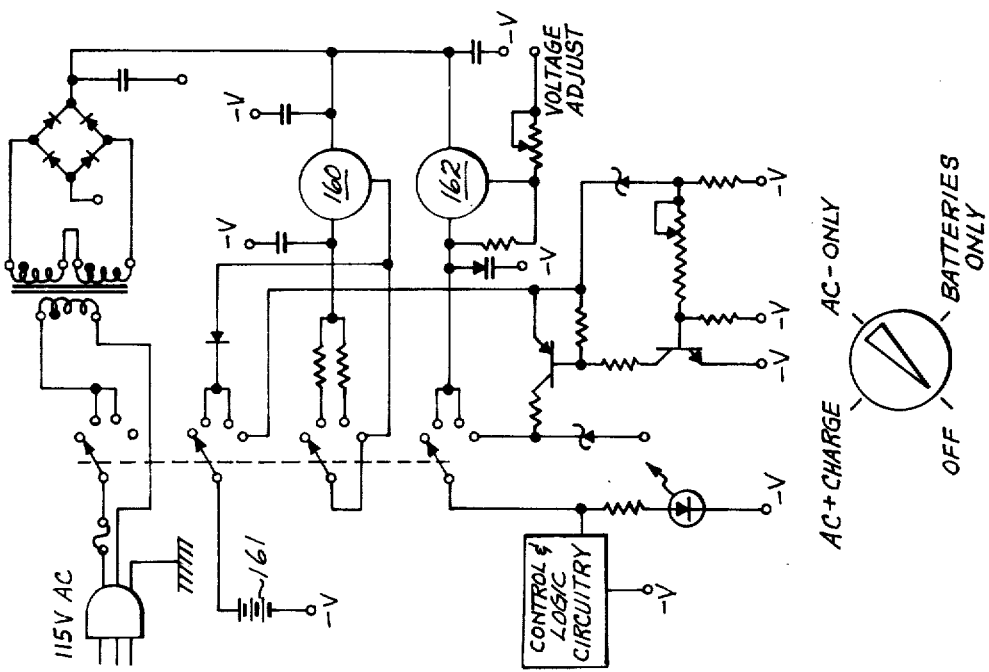
FIG. 6 is an electrical schematic of a preferred embodiment of the power supply of the present invention.

With reference to FIG. 6, the selectable power supply sources are well-known in the prior art, consequently only a brief description will be provided. Constant current source 160 is used to charge battery pack 161 contained within probe drive assembly. Current source 160 charges battery pack 161 at either a fast or slow rate when the present invention is not operated by battery pack 161. Constant current source 162 is used as a regulator for the control and logic circuitry.

Figure 7:
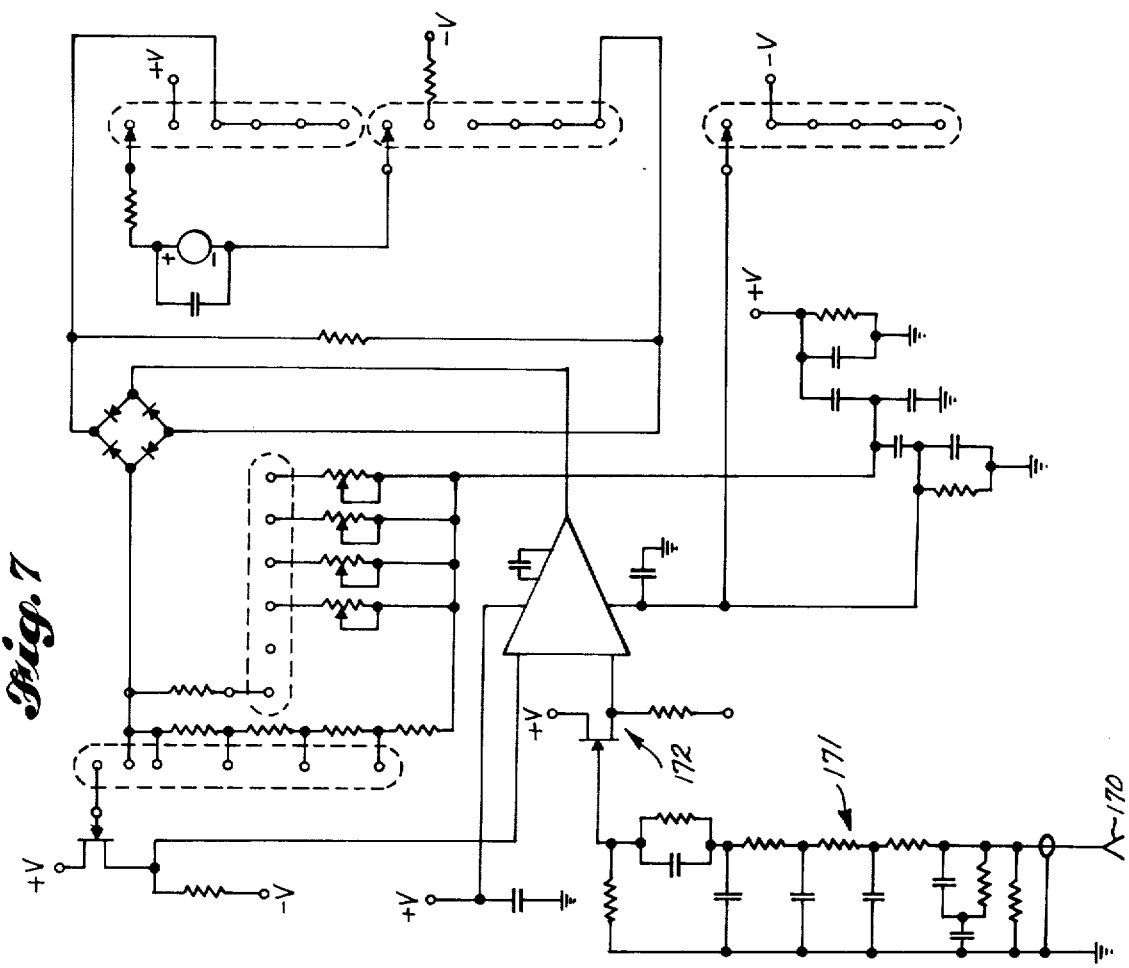
FIG. 7 is an electrical schematic of a preferred embodiment of the meter circuit of the control and readout assembly of the present invention.

With referene to FIG. 7, the meter circuitry used to practice the present invention is well-known in the prior art, as a result only a brief description is provided. Signal 170, representing the surface roughness as detected by the transducer located in probe 16, passes through a multipole passive RC filter shown generally at 171. The output of the filter is amplified by a field effect transistor voltage follower, shown generally at 172. Voltage follower 172 output is amplified with four selectable gains corresponding to four roughness value ranges, rectified and monitored on a meter.

Typical Roughness Measurement

To measure the roughness of a typical fastener hole, a pilot 22 is selected with a circular extension 48 which substantially matches the diameter of the hole to be inspected. Pilot 22 is snap fitted into face plate 4 of probe drive assembly 1. For straight fastener holes, low end set potentiometer 112 is adjusted to approximately the minimum setting of 0.0 inches, and the high end set potentiometer 114 is adjusted to a setting which gives a probe stroke length approximating the material thickness. For countersunk fastener holes, the low end set potentiometer 112 is adjusted to a setting corresponding to the countersunk depth. The high end set potentiometer 114 is set in the same manner as for straight holes.

Probe drive assembly is then inserted into the fastener hole such that cylindrical extension 48 and projection 52 extends into the fastener hole, and pilot 22 rests upon the top surface of the material into which the fastener hole is bored therein. Start button 133 is pressed, probe 16 and stylus 16a traverse the interior wall portion of the fastener hold and a roughness measurement is visually displayed on a meter. The process continues until stop button 150 is pressed. At that time, probe 16 is retracted within the probe drive assembly 1 and the measurement is terminated.

For roughness measurements of flat surfaces, probe drive assembly 1 is placed upon the subject surface such that top surface 54 of case cover 3 rests upon the subject surface. Low end set potentiometer 112 and high end set potentiometer are set as desired, and start button 133 is pressed. As has been described, probe 16 and stylus 16a traverse the subject surface, and a roughness measurement is visually displayed on a meter. The process continues until stop button 150 is pressed. At that time, probe 16 is retracted within probe drive assembly 1 and the measurement is terminated.

Accordingly, the foregoing disclosure and description thereof are for illustrative purposes only and do not in any way limit the invention which is defined only by the following claims.

What is claimed is:

1. An apparatus for measuring the finish of the interior surface of a fastener hole comprising:
   a case;
   a probe containing a stylus and transducer therein to convert vertical motions of said stylus as it traverses surface irregularities into electrical signals by said transducer, said probe mounted to a carriage means slidably mounted within said case;
   a pilot adapted to removably fit upon said case, said pilot containing a cylindrical extension thereupon with a diameter substantially equal to that of a fastener hole and adapted to fit within said hole, said extension containing a hole therein to encompass said stylus and probe such that when said extension is inserted into said fastener hole said stylus and probe pass through said hole and contact the interior portion of said fastener hole;
   reciprocating means contained within said case, said means secured at one end to said carriage and at the other end to said case, said reciprocating means adapted to slidably move said carriage means within said case;
   means for determining the position of said carriage means as said carriage means slidably moves within said case;
   means for electronically presetting the position of said carriage;
   means for electronically comparing the position of said carriage means with a plurality of selectable carriage positions, said means causing said carriage means to slidably reverse its direction of travel when said carriage means reaches said positions; and
   means for displaying said electrical signals produced by said stylus and said transducer.

2. The apparatus of claim 1 wherein said carriage means comprises a nut with a multiple diameter hole therein, said hole existing substantially through the length of said nut.

3. The apparatus of claim 2 wherein said nut is slidably mounted to said case by a plurality of grooves contained within said case, said grooves engaging said nut by a plurality of mutually complementary tracks thereupon.

4. The nut of claim 2 wherein said multiple diameter hole contains a plurality of threaded teeth therein, said teeth existing along a portion of said hole.

5. The apparatus of claim 2 wherein said reciprocating means comprises a motor secured to a lead screw, said lead screw coaxially mounted within said multiple diameter hole, said lead screw containing a plurality of threaded teeth said teeth engaging said plurality of teeth in said multiple diameter hole.

6. The apparatus of claim 1 wherein said means for determining the position of said carriage means comprises a potentiometer assembly with a variable wiper arm, said wiper arm engaging said nut.

7. The apparatus of claim 6 wherein said wiper arm is engaged to said nut by a yoke.

8. The apparatus of claim 1 wherein said means for electronically comparing the position of said carriage means comprises a plurality of voltage comparators, wherein said comparators compare the position of said carriage means as determined by said potentiometer assembly with a plurality of selectable carriage positions such that when said carriage position equals a selectable carriage position, said comparator generates a signal causing said reciprocating means to reverse its direction of reciprocation.

9. The apparatus of claim 1 wherein said display means comprises a meter with a plurality of selectable display ranges.

10. The apparatus of claim 1 wherein the means for presetting the position of said carriage means comprises a plurality of voltge comparators, the first of said voltage comparators comparing a first predetermined voltage with the voltage representing the position of said carriage, the second of said voltage comparators comparing a second predetermined voltage with the voltage representing the position of said carriage, the output of said comparators causing the reciprocating means to reverse its direction of reciprocation when said carriage position voltage exceeds either said predetermined voltages.

* * * * *